F. W. WOOD.
WARNING SIGNAL SYSTEM.
APPLICATION FILED JUNE 7, 1915.

1,232,745.

Patented July 10, 1917.
2 SHEETS—SHEET 1.

Witnesses:

Inventor
Frank W. Wood.
By his Attorneys

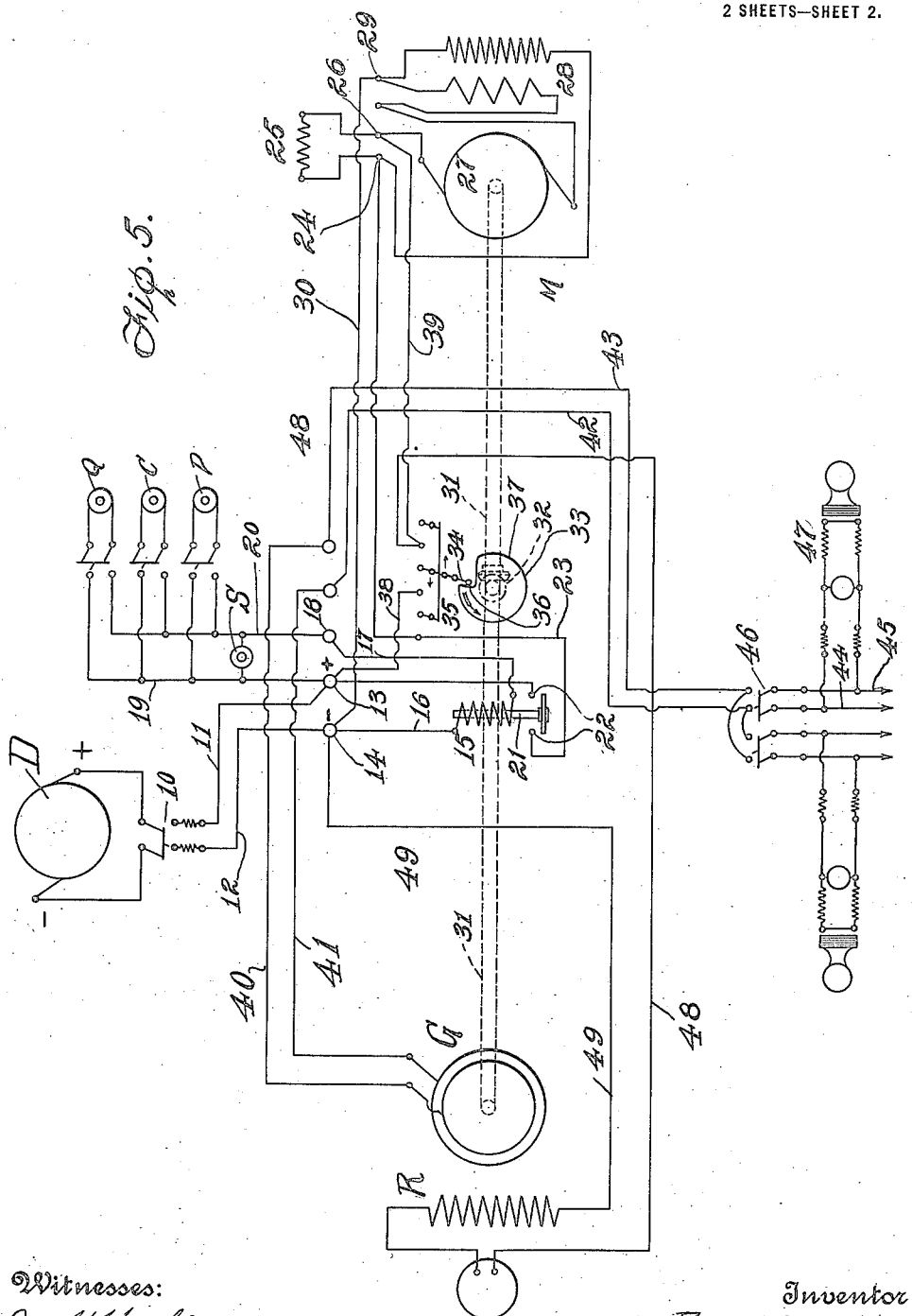

UNITED STATES PATENT OFFICE.

FRANK W. WOOD, OF BROOKLYN, NEW YORK, ASSIGNOR TO CHARLES CORY & SON, INC., OF NEW YORK, N. Y., A CORPORATION OF NEW YORK.

WARNING-SIGNAL SYSTEM.

1,232,745.  Specification of Letters Patent.  Patented July 10, 1917.

Application filed June 7, 1915. Serial No. 32,575.

*To all whom it may concern:*

Be it known that I, FRANK W. WOOD, a citizen of the United States, residing at Brooklyn, in the county of Kings and State of New York, have invented new and useful Improvements in Warning-Signal Systems, of which the following is a specification.

This invention relates to signal apparatus, and though the apparatus may be used under various conditions or environments, it has been described by way of example in the following specification as applied to a signal apparatus supposed to be used aboard ship.

A principal object of the invention is to provide a very simple signal apparatus in which the signal devices may be operated from a number of points and to avoid the use of cumbersome circuit breaking devices in connection with the signals.

A further object of the invention is to simplify the construction and arrangement of the signal devices to enable them to be operated by an alternating current.

A further object of the invention is to provide signal apparatus in which the mechanism of the apparatus is concentrated so far as possible at a single point in order to facilitate the quick adjustment or repair of the apparatus by an attendant in case of any injury or mishap to the mechanism.

Further objects of the invention will appear more clearly hereinafter.

The invention consists in the general combination of parts and simplicity of details, all of which contribute to produce an efficient signal apparatus.

A preferred embodiment of the invention will be described in the following specification, while the broad scope of the invention is pointed out in the appended claims.

In the drawing,

Fig. 5 is a diagrammatic view illustrating the features of the invention which relate to the general arrangement and wiring of the apparatus.

Figure 1:
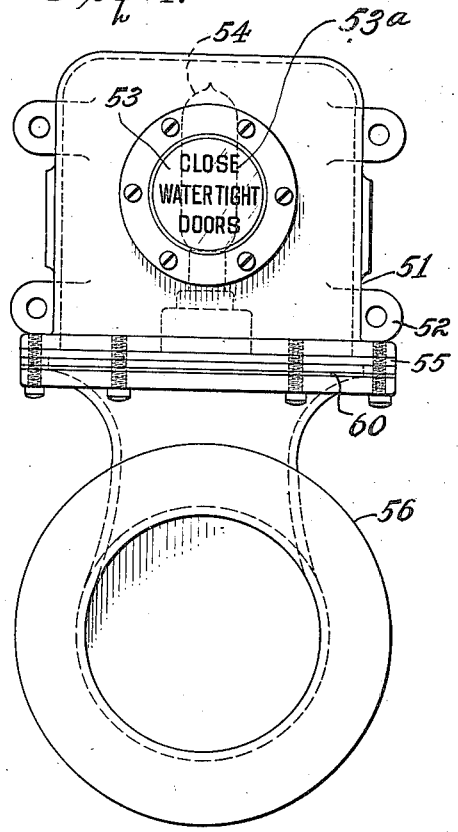
Figure 1 is a front elevation of a signal device, embodying features of my invention.
Figure 2:
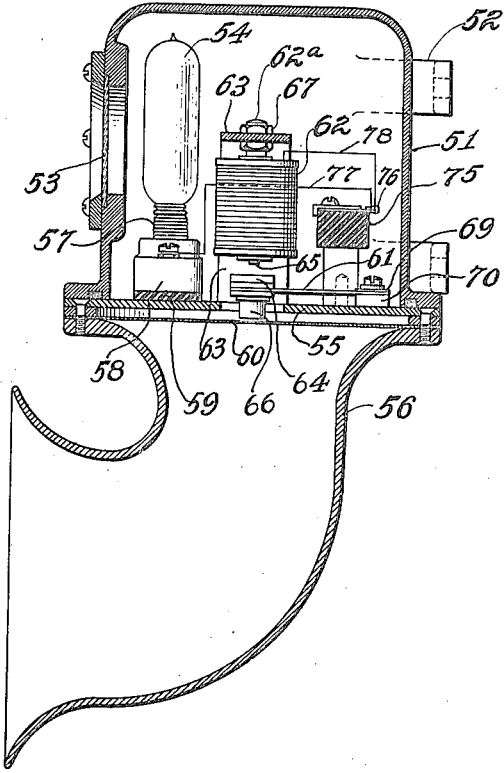
Fig. 2 is a vertical section through the signal device shown in Fig. 1.
Figure 3:
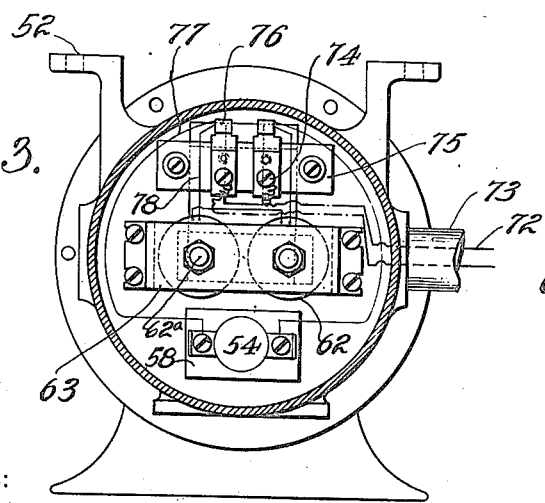
Fig. 3 is a cross-section taken through the upper part of the case of the device and illustrating details of the arrangement of the mechanism within the case.
Figure 4:
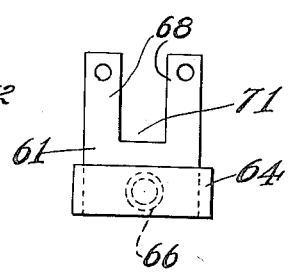
Fig. 4 is a plan showing a vibrator removed from the case. This vibrator constitutes a feature of the invention.

Referring more particularly to the parts and particularly to Fig. 5, I shall now describe the general arrangement and wiring of the apparatus, but before proceeding to a detailed description of this apparatus, it should be stated that the apparatus is brought into operation preferably by means of circuit closing devices such as push buttons or similar means placed at different points on the ship, from which the apparatus is to be controlled. In the present instance, I have represented the control as operating from four points such as the quarter-deck, conning tower, conning platform and the central station, but, of course, there may be any desired number of such points of control.

The source of current which puts the apparatus in operation is preferably a direct current, but for reasons which will appear hereinafter, I prefer to operate the signal devices through the agency of an alternating current. The direct current which is always available through the agency of these circuit closing devices is preferably supplied by a dynamo D or similar source of current, the current from which is supplied through a suitable switch 10 to two conductors 11 and 12 which connect respectively with binding posts 13 and 14. The circuit closing devices or push buttons indicated by the letters Q, C, P and S are wired in any suitable manner which will enable them to close the circuit from the dynamo, and the closing of this circuit operates to set the apparatus in operation. This is preferably accomplished through the medium of a solenoid coil 15, one end of which is connected by a conductor 16 with the aforesaid terminal 14 while the other end of the coil is connected by a conductor 17 with binding post 18, and this binding post is wired to the push buttons Q, C, P and S through the medium of conductors 19 and 20, the conductor 19 leading from the binding post 13. The push buttons Q, C, P and S are in parallel so that if any one of them is closed, the circuit from the binding post 13 will be closed through the conductors 17 and 16 and through the coil 15. This arrangement provides a push button circuit controlled from a plurality of points that operate to put the apparatus into operation, The solenoid preferably operates to start the motor, and this motor through any suitable means operates the generator supplying an alternating current to the signal circuits. In order to accomplish this result, I prefer to provide the solenoid coil 15 with a core or armature 21 which is drawn up when the coil is energized so as to bridge two contacts 22 and close the circuit through the motor M by way of conductor 23 which carries the current into the motor through the binding post 13. This conductor brings the current to the binding post 24 from which the current passes through a suitable resistance 25 and thence to the motor terminal 26 from which the current passes through the armature 27 of the motor and through the field coils 28 to the terminal 29, said terminal 29 being connected by the return conductor 30 with the binding post 14. In this way a starting circuit is closed through the motor and the motor then begins to run. As the push buttons Q, C, P and S may hold the starting circuit closed only temporarily, I provide means for establishing a permanent or running circuit through the motor to enable it to continue in operation after the push button circuit is opened. The opening of the starting circuit results of course from the fact that as soon as the coil 15 ceases to attract its core or armature 21, the armature or core drops down or recedes from the coil and opens the circuit through the conductor 23. For this reason I prefer to provide mechanical means actuated by the motor for establishing a running circuit through the motor.

This arrangement is illustrated diagrammatically and consists in providing the shaft 31 of the motor with a speed reducing device 32 which operates to drive a mechanical part such as the cam 33. In the normal position of the cam, that is, when the apparatus is not in operation, an arm 34 of a switch 35 is received in a notch or depression 36 in the cam. When the cam has made a sufficient rotation when actuated by the motor, the notch 36 will pass from under the arm 34 and the regular or circumferential edge 37 of the cam will hold the switch 35 in its closed position. This connects conductor 38 and conductor 39 and establishes a circuit through the motor M. Because the conductor 39 is connected with the terminal 26, this switch will be maintained closed until the cam 33 has made a complete revolution at which time the notch 36 will come again under the arm 34 and permit the switch to open. The motor M preferably drives an alternating current generator G which is preferably directly connected to the motor through the medium of the motor shaft 31. Although in the diagram the generator and the motor are represented as widely separated, this is simply for convenience, and in practice they are very close together, the narrow space between them being occupied by the switch 35. From the generator G an independent circuit extends through conductors 40 and 41 and conductors 42 and 43 to parallel conductors 44 and 45 which may be connected by switches 46 with conductors 42 and 43. Between the parallel conductors 44 and 45, any number of signal devices such as the signal devices 47 may be placed in parallel. With this arrangement evidently the signals will sound as long as the generator is in operation, but the signals will cease to operate when the motor circuit is open, as described above at the switch 35.

In order to control the voltage of the alternating current, I prefer to provide a rheostat R, the circuit through which is closed from the switch 35 through conductor 48, said conductor 48 extending from a contact of the switch. The current from the rheostat passes to the binding post 14 by a return conductor 49.

Any desired form of signal device or devices may be used with this apparatus. I prefer, however, to employ a signal device having the characteristics which I shall now describe.

This signal device as suggested above, is preferably operated by means of an alternating current. In the present embodiment this signal is a combination of an audible and visible signal. It preferably comprises a case 51 which may, if desired, have lugs 52 to facilitate its being secured to a bulk-head or wall, and at one side this case is provided with a window 53 behind which an electric lamp 54 is mounted. This lamp 54 is mounted on a base plate 55 which is disposed between the case 51 and a horn 56. If desired, the socket 57 of the lamp may be supported on a suitable base 58 seated on a gasket 59 of soft rubber.

Within the case I provide means for emitting a sound which may include a member or diaphragm 60 adapted to cause the emission of a sound when vibrated. Although, if desired, this member 60 may be vibrated directly, I prefer to vibrate it indirectly by striking it by means of another member or vibrator 61. This vibrator 61 is preferably actuated by electro-magnetic means such as magnets 62. These magnets are each adjustably supported by a bolt 62ª from the cross-bar of a U-shaped bracket 63 which is attached in an inverted position on the plate 55. Near the free end of the vibrator 61, an armature 64 is attached which is attracted by the poles 65 of the magnets when the magnets are energized.

The vibrator 61 is preferably made of a resilient plate, the resiliency of which causes the vibrator to vibrate toward and from the diaphragm 60 to correspond with the alternations in the current. That is, the vibrator 61 is constructed so that its natural rate of vibration is substantially the same as the frequency of alternations in the current so that the vibrator readily keeps in synchrony with the alternation of the current. Hence, the poles 65 at each period of excitation or energization of the magnet, attract the armature and pull the vibrator away from the diaphragm but the resiliency of the vibrator immediately returns it and strikes the diaphragm by means of the button 66 on the under side of the vibrator. The adjustable bolt 62ª which supports each magnet is provided with adjusting nuts 67 which enable the magnet to be nicely adjusted toward or away from the vibrator. This enables the loudness of the sound to be regulated and also enables the number of vibrations of the vibrator to be altered. The vibrator is preferably in the form of a thin U-shaped plate, the middle portion of which is cut away on one side so as to form two tongues 68. The ends of these tongues 68 are clamped under a suitable plate 69 on a base 70. The width and depth of the gap or cut 71 in this plate determines the rate of natural vibration, and hence, the natural period of vibration may be very nicely determined by ascertaining experimentally beforehand, the proper size for this gap.

The circuit wires 72 may be brought into the case through a suitable conduit or pipe 73 attached on one side of the case. These wires are connected respectively to binding posts 74 mounted on a suitable insulating block 75 and provided with small metallic clips 76 from which conductors 77 and 78 extend to the lamp 54 and the magnets 62. If desired, the window 53 may have a transparent sign 53ª which carries a direction or order to be executed after the signal operates.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

The notch 36 of the cam is designed so that when the current is shut off, the motor will not "coast" sufficiently to bring the notch past the switch; if the motor is large, it may be necessary to provide it with an automatic brake or any other means which will bring it to a quick stop. Although I have illustrated the push buttons as operating to close the motor circuit by means of a relay or solenoid 15, obviously if desired, the push buttons may be in the starting circuit. Such a simple wiring arrangement is feasible with small currents, but I prefer to use the relay where the currents are large.

What I claim is:

1. In a signal apparatus, in combination, a controlling circuit including a hand operated circuit closing device, means actuated by the closing of said controlling circuit and including a normally inactive motor for generating an alternating current, a signal, and signal actuating means having a member for actuating the signal, said member tending to vibrate naturally at substantially the same rate as the frequency of said alternating current, and electro-magnetic means actuated by said alternating current, for vibrating said member.

2. In a warning signal apparatus, in combination, a normally-inactive controlling circuit including a hand operated circuit closing device, a motor circuit, electro-magnetic means in said controlling circuit rendered active by the closing of the controlling circuit for closing said motor circuit, an alternating current generator actuated by said motor, an alarm device having a diaphragm, and electro-magnetic means actuated by the alternating current from said generator to vibrate said diaphragm.

3. In a warning signal apparatus, in combination, a controlling circuit including a hand operated circuit closing device, a motor circuit, electro-magnetic means in said controlling circuit for closing said motor circuit, an alternating current generator actuated by said motor, an alarm device having a diaphragm, and electro-magnetic means including a member tending to vibrate at a rate corresponding to the frequency of the said alternating current, actuated by the alternating current from said generator to vibrate said diaphragm.

4. In a warning signal apparatus, in combination, a controlling circuit including a hand operated circuit closing device, a motor circuit, electro-magnetic means in said controlling circuit for closing said motor circuit, an alternating current generator actuated by said motor, an alarm device having a diaphragm, and electro-magnetic means including a resilient vibrator tending naturally to vibrate at substantially the same rate as the frequency of said alternating current, to strike the said diaphragm.

5. In a warning signal apparatus, in combination, a controlling circuit including a hand operated circuit closing device, a motor circuit, electro-magnetic means in said controlling circuit for closing said motor circuit, an alternating current generator actuated by said motor, an alarm circuit including an alarm device having a diaphragm, electro-magnetic means actuated by the alternating current from said generator to vibrate said diaphragm, and means actuated by said motor for opening the motor circuit.

6. An alarm device comprising, in combination, a diaphragm, a member constructed to vibrate to intermittently strike said diaphragm, an electro-magnet adjacent said member to attract the same to cause vibration of said member, means for energizing said electro-magnet with an alternating current having a frequency corresponding with the natural rate of vibration of said member, and control mechanism for said energizing means, said control mechanism being rendered active at will and automatically maintained active during a predetermined period.

7. In a signal apparatus, in combination, a controlling circuit including a hand operated circuit closing device, a motor and a motor circuit therefor, a solenoid in said controlling circuit for closing said motor circuit, an alternating current generator driven by said motor, an alarm circuit including alarm devices actuated by the alternating current from said generator, and mechanical means actuated by said motor for opening said alarm circuit.

8. In a signal apparatus, in combination, a controlling circuit including a hand operated circuit closing device for temporarily closing the controlling circuit, a motor circuit including a motor, a solenoid in said controlling circuit for closing the circuit through said motor to start the same, mechanical means driven by said motor for holding the motor circuit closed after it is opened at said solenoid, an alternating current generator driven by said motor, and a signal circuit including a plurality of signal devices actuated by the alternating current from said generator, said mechanically actuated part operating to open said signal circuit after a predetermined movement of said motor.

9. In a signal apparatus, in combination, a controlling circuit including a hand operated circuit closing device for temporarily closing the controlling circuit, a motor and a motor circuit, a solenoid in said controlling circuit for establishing a circuit through said motor, mechanical means actuated by said motor, and a switch controlled thereby for establishing and maintaining a circuit through said motor independent of said solenoid, an alternating current generator actuated by said motor, and a signal circuit including a plurality of signal devices actuated by the alternating current from said generator.

10. In a signal apparatus, in combination, a controlling circuit including a hand operated circuit closing device for temporarily closing the controlling circuit, a motor and a motor circuit, a solenoid in said controlling circuit for establishing a starting circuit through said motor, a cam actuated by said motor at a relatively slow speed, and a switch controlled thereby for establishing and maintaining a circuit through said motor independent of said solenoid, an alternating current generator actuated by said motor, and a signal circuit including a plurality of signal devices actuated by the alternating current from said generator, said cam operating to open said switch to stop the motor and cease the actuation of said signal devices.

11. An alarm device comprising, in combination, a diaphragm constructed to vibrate to emit a sound, a resilient vibrator mounted to vibrate and strike said diaphragm, an electro-magnet for actuating said vibrator, means for energizing said electro-magnet with an alternating current having a frequency substantially the same as the natural rate of vibration of said resilient vibrator, and control mechanism for said energizing means, said controlled mechanism being rendered active at will and automatically maintained active during a predetermined period.

12. An alarm device comprising, in combination, a diaphragm constructed to vibrate to emit a sound, a resilient vibrator mounted to vibrate and strike said diaphragm, an electro-magnet for actuating said vibrator, means for energizing said electro-magnet with an alternating current having a frequency substantially the same as the natural rate of vibration of said resilient vibrator, said vibrator consisting of a resilient plate having two vibratable tongues integral therewith and extending therefrom in spaced relation, and a bar of magnetic metal attached to said plate constituting an armature and mounted to strike said diaphragm.

13. In a signal apparatus, in combination, a hand-operated circuit closing device, means controlled by the actuation thereof and including a normally inactive motor for generating an alternating current, and a signal having a member for giving the signal tending to vibrate naturally at substantially the same rate as the frequency of said alternating current, and electro-magnetic means actuated by said alternating current for vibrating said member.

14. In apparatus adapted to produce warning signals concurrently at different points, a generating mechanism for alternating current and having an external circuit, one or more signals in said circuit, each signal including electro-magnetic means within the circuit, a vibratory member having a natural frequency approximating the periodicity of the alternations of the circuit, and an element adapted to produce an audible signal by the vibrations of said member, in combination with a normally-inactive prime mover for said generating apparatus, said prime mover being of a type to quickly bring the generating apparatus to speed, a controlling circuit for said prime mover, and a make and break device in the controlling circuit operative at will.

15. In apparatus adapted to produce warning signals concurrently at different points, a generating mechanism for alternating current and having an external circuit, one or more signals in said circuit, each signal including an electro-magnetic means within the circuit, a vibratory member having a natural frequency approximating the periodicity of the alternations of the circuit, and an element adapted to produce an audible signal by the vibrations of said member, in combination with a normally-inactive prime mover for said generating apparatus, said prime mover being of a type to quickly bring the generating apparatus to speed, a normally-inactive operating circuit for said prime mover, a normally-inactive controlling circuit, means within the controlling circuit for closing the operating circuit, and make and break mechanism in the controlling circuit operative at will.

16. In apparatus of the character described and in combination, an alternating current generator normally inactive and adapted to operate one or more signals during activity, a normally-inactive prime mover for the generator, means for rendering said prime mover active at will, and means rendered active by the movements of the prime mover for maintaining such prime mover activity during a predetermined period, whereby said signals will be operated for predetermined periods.

In testimony whereof I have hereunto set my hand in presence of two subscribing witnesses.

FRANK W. WOOD.

Witnesses:
F. D. AM EN,
JOHN J. HALEY.